Patented Mar. 16, 1954

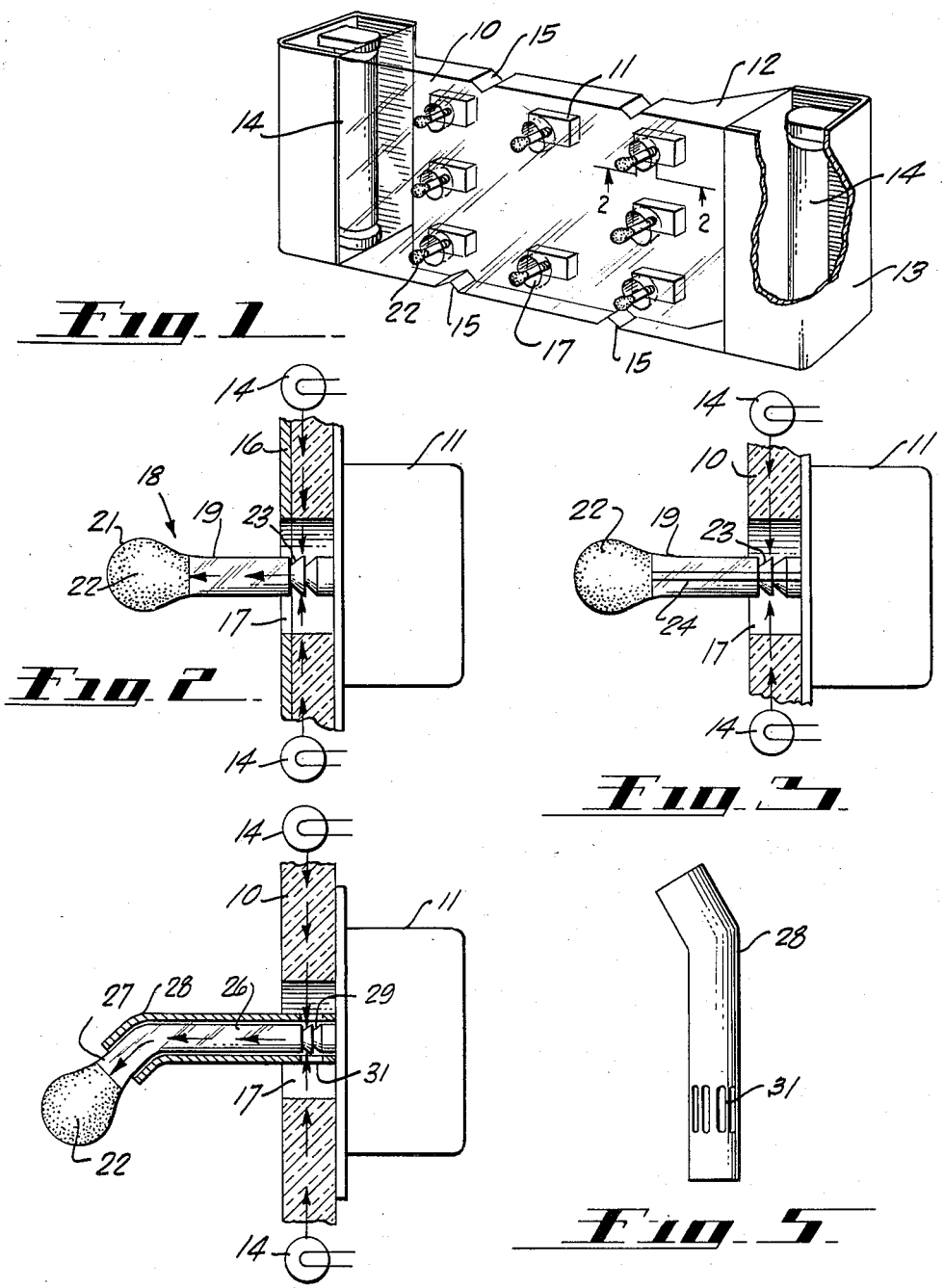

2,672,551

UNITED STATES PATENT OFFICE 2,672,551

SELF-LIGHTED CONTROL OPERATING MEMBER

Donald H. Hale and Binford Hunter Owens, Santa Monica, Calif., assignors to Douglas Aircraft Company, Inc., Santa Monica, Calif.

Application June 9, 1949, Serial No. 98,114

2 Claims. (Cl. 240—8.16)

1

This invention relates to manually operated levers or handles for closing and opening circuits in dark places such as in airplane cockpits which have to be unlighted during flight. While the invention is particularly well adapted for utilization with the electrical and hydraulic switches mounted on the instrument panel of aircraft, it is by no means limited thereto in its application as will hereinafter become apparent.

The instrument panels of aircraft bear a multitude of knobs, buttons, handles and levers and the panel and the rest of the cockpit must remain substantially dark to obviate light interference with the pilot's forward vision during flight. Consequently, when the pilot needs to operate a certain one of these multitude of switches in the dark, he is quite apt to select the wrong lever and operate the wrong switch, with sometimes disastrous consequences to the aircraft.

The present invention renders this occurrence quite unlikely by illuminating slightly from light sources hidden at the vertical edges of the panel, the outermost end only of the handles. This end is rendered visible and plainly distinguishable as to location and attitude from adjacent handles without thereby throwing any light into the cockpit therefrom or from the panel or the light sources. The panel is composed of such a material as to transmit light lengthwise thereof and is constructed to pass no light outwardly from its front face. The levers to be rendered visible without throwing light into the cockpit are composed of a light transmitting but tough and strain-resisting material having means at their inner ends for bending the light received laterally from the panel longitudinally forwardly, and outer ends including means for rendering them visible by diffused light without emitting much light to the purposely dark cockpit.

The other aims and accomplishments of the invention will be either set forth, or become apparent, hereinafter.

The inventive principles may take many forms of construction within the scope of the present concepts and the ambit of the annexed claims; it is therefore to be understood that the several species of construction and design shown in the attached drawings and the immediately following description are provided merely for the purpose of manifesting and clarifying the invention.

In these drawings,

Figure 1 is a perspective of an instrument panel bearing switch levers constructed according to the invention;

2

Figure 2 is a fragmentary section on line 2—2 of Figure 1, showing in enlarged detail the construction and mounting and action of one of the levers of the invention;

Figure 3 is a similar view of a modified construction and configuration of lever;

Figure 4 is a similar view showing a further modification of the lever configuration; and Figure 5 is a side elevational view of a reinforcing sleeve.

In the typical constructional embodiment of the foregoing and other inventive concepts which are illustrated, by way of exemplification only, in Figures 1 and 2, the configuration comprises a transparent, illuminated panel 10 carrying a plurality of switch units or boxes, each containing a control mechanism to be operated, and designated by numeral 11. These boxes are mounted to the rear face of the elongate rectangular sheet 10 composed of a suitable, well known, light-transmitting or transparent plastic, of which Plexiglas and Lucite are good examples. The opposite vertical edges of this sheet are enlarged and beveled as at 12 and bear, in lengthwise contact therewith, elongate opaque light boxes 13, which are open on their contacting faces coextensively with the enlarged portion 12 of the sheet 10. Each light box contains a light source 14 which may consist of a single elongate incandescent, or fluorescent, lamp or a series of separate incandescent bulb-lamps. Notches 15 may be formed in the top and bottom edges of the sheet 10 in oppositely located positions and serve to direct inwardly from each of these extreme edges, stray light rays passing lengthwise through the panel from the light sources and extending closely adjacent the top and bottom edges thereof, whereby to more extensively utilize, and evenly distribute, the light emanating from the sources 14. In order to prevent the light passing through the sheet 10 parallel to its faces from each edge thereof from emanating from the outer, or pilot's, face thereof, an opaque masking member 16, which may consist of a sheet of aluminum alloy or the like or a coating of an opaque paint, may be disposed coextensively over the said face in facewise engagement therewith, as indicated in Figure 2.

The supporting plate or sheet 10 and mask 16 are penetrated from front to rear with a multitude of openings 17 here shown as only eight in number, being preferably cylindrical in shape and of relatively small diameter. Through each of these openings a switch operating lever or handle 18 projects from the corresponding switch box forwardly towards the pilot or other observer of the panel.

Each handle 18 consists of an elongate cylindrical, solid rod 19 composed of a suitable transparent or light-transmitting material of a tough, elastically deformable and strain resisting nature. Plastics in the class of Plexiglas, Lucite, and other methyl methacrylates, or the like, are therefore well fitted for the present purposes. The levers are pivotally mounted, that is, have an up and down movement about a suitable pivot, not shown, but disposed at its inner end in the switch box and constructed in any suitable well known manner.

The outer end of each such lever is enlarged, preferably bulbously, or deformed spherically as typically represented by the portion designated 21, and the outer surface of this bulbous enlargement is rendered translucent or light diffusing as by frosting, etching, or sanding, as indicated at 22, or in the like manner rendered light dispersing, so that the only light reaching the cockpit from the lighted panel and light source through the sheet 10 and the levers 18, will be of a diffused, misty non-focused nature. Notwithstanding, the inner or pilot end of the lever is caused to glow sufficiently to distinctly segregate the individual levers and indicate the exact positions and attitudes thereof, even in an otherwise totally dark cockpit. The light intensity of the sources 14 and the light transmitting and reflecting nature of the transmitting media intervening between the light source and the bulbous tip are so coordinated and correlated, however, that light rays emerging from the bulbous tip are so weak and of such low amplitude and frequency as to be unable to produce a glare in the pilot's eyes and hence do not interfere with flight vision straight ahead or to either side.

The inner end of each lever 18 is circumferentially beveled or grooved to provide a plurality (here shown illustratively as only two in number) of annular reflecting surfaces 23 arranged substantially at 45° to the plane of the sheet 10 and disposed in longitudinal series and extending circumferentially of the handle at an angle of the order of 45° to the longitudinal axis thereof. The bevels are cut radially inwardly into the handle a distance only sufficient to provide an effectively large angled reflecting surface consistent with maintaining sufficient flexure and torsion resisting strength in the shank or inner end of the handle to preclude breakage during operation. When the light sources are energized, they constitute the only light sources in the otherwise dark cockpit during flight and being obscured and enclosed, the light rays pass therefrom into each edge 12 of the sheet 10 and pass transversely across the sheet towards the center thereof from each edge, therefore passing transversely across the handles. Upon striking the beveled reflecting surfaces, however, the light rays are reflected, or bent, forwardly therefrom, passing longitudinally forwardly in the handle parallel to the longitudinal axis of the handle. At the foremost tip of the handle, these rays strike the diffusing surface 22 and cause it to glow as a subdued but clear-cut and localized light spot thus clearly and distinctly optically segregating each handle from the multitude of adjacent ones while passing enough light to the pilot's eyes to indicate the exact location and attitude of each lever.

The construction illustrated in Figure 3 embodies the same basic principles as those set forth in connection with the form shown in Figures 1 and 2, but in addition provides means for enabling the handles to withstand unusually high and frequently applied manipulating strains or to be made of glass or some other desired plastic more brittle than Plexiglas, Lucite, or the like. As one means to this end, the handle may incorporate an elongate metallic stud 24 disposed along the longitudinal center line of the shank and substantially coextensive therewith. The stud may be configured with the handle by inserting it in a pre-bored aperture in the handle or it may be molded in with the rest of the handle. In any event, its inner end is suitably threadedly engageable into the same switch component to which the inner end of the handle is attached. By virtue of this construction and configuration the stud absorbs and resists flexural forces applied to the handle and removes them from the plastic material when the handle is operated up and down and is accidentally brought to bear forcefully against upper and lower abutments and otherwise successfully resists the flexural forces incident to rough manipulation.

For the betterment of rotary-type switch handles made of a transparent plastic which are strong enough for ordinary purposes but may be subjected to unusually high torsional strains, the constructional modification illustrated in Figure 4 is contemplated by the invention as satisfactory for withstanding substantially every operating strain to which such handles are liable. In this species, the outer free end 27 of the shank 26 is bent at an angle of approximately 45° to the inner portion and the entire length of the shank is provided with a rigid metallic sleeve 28. This sleeve is integrated with the plastic shank in any suitable manner if desired, as by heat or pressure, keying, or the like and is thus adapted to absorb the shell-fibre torsional and flexural strains applied to the handle end either intentionally, or accidentally. In either event it serves to preclude breaking of the handle at the bend and prevents torsional rupture of the handle under rotational forces applied thereto as well as serving the same purpose as the stud of the preceding embodiment in resisting flexure of the handle. In order to permit light rays to pass from the light sources 14 to the annular bevels 29 and thence outward through the shank, the lower end of the sleeve 28 is provided with a plurality of spaced elongated openings 31, leaving enough metal between them to resist torsional and bending loads.

Although several specific configurations have been described in detail to more completely and constructively disclose the inventive concepts, it is to be definitely understood that the invention itself as a concept is limited in the physical embodiments which it can take only by the scope and ambit of the sub-joined claims which define the invention in terms of configurations of definite physical elements combined and coacting according to the foregoing principles to provide an article capable of accomplishing the postulated results.

We claim:

1. A control-operating system in which the operating members are made visible, in dark places, by transmitted light without appreciably illuminating said places, said system comprising; methyl methacrylate light transmitting support means having its outer face masked, said support means being adapted for pivotally supporting the one end of a control operating member with the other end of said member laterally projecting from said support; means for passing light longitudinally through said support means and across a control operating member; at least one methyl methacrylate light transmitting control-operating member pivotally disposed in said support means; annular bevel means forming a portion of the periphery of said member near its pivotally supported end for receiving light from said support means and reflecting it longitudinally forwardly in said member, said bevel means being forwardly inclined toward the opposite end of said member; and means on said opposite end of said operating member for onwardly diffusing the light transmitted longitudinally in said member, whereby to cause said opposite end to glow in such contrast with its surroundings as to plainly indicate its location on said masked support means, and to indicate its operational position.

2. A control panel illumination system in which translucent operating members are visible by transmitted light without appreciable illumination of areas adjacent said members, comprising: a plurality of methyl methacrylate light transmitting control-operating members, said members being pivoted adjacent one end thereof; substantially planar translucent methyl methacrylate support means adapted to transmit light received at its edge throughout its interior; said support having its outer face masked; a plurality of means forming apertures in said support positioned to permit said operating members to project therethrough; elongate means positioned closely adjacent and approximately parallel to a portion of the edge of said support for generating light to be transmitted through said support and across said projecting operating members; annular bevelled surface means inclined toward the projecting end of said member formed in each of said members and positioned in said apertures; said surface means forming a portion of the surface of said members and being contained within the envelope formed by the projected surface of the remainder of said body to reflect and concentrate the light longitudinally within said envelope toward the projecting end of said member to cause said projecting end to glow in such contrast to its surroundings as to plainly indicate the general location of said member on the face of said support and to indicate the angular operational position of said member.

DONALD H. HALE.
BINFORD HUNTER OWENS.

References Cited in the file of this patent

UNITED STATES PATENTS

| Number | Name | Date |
| --- | --- | --- |
| 1,707,965 | Scantlebury | Apr. 2, 1929 |
| 1,739,954 | Du Pont | Dec. 17, 1929 |
| 1,965,865 | Thompson | July 10, 1934 |
| 2,051,288 | Curtis, Jr. | Aug. 18, 1936 |
| 2,110,233 | Nabakowski | Mar. 8, 1938 |
| 2,125,906 | Frei, Jr. | Aug. 9, 1938 |
| 2,186,143 | Neugass | Jan. 9, 1940 |
| 2,217,526 | Pelikan | Oct. 8, 1940 |
| 2,218,074 | Smith | Oct. 15, 1940 |
| 2,232,822 | Homsher | Feb. 25, 1941 |
| 2,285,374 | Dohsmann et al. | June 2, 1942 |
| 2,334,479 | Creager | Nov. 16, 1943 |
| 2,338,748 | Watkiss | Jan. 11, 1944 |
| 2,374,408 | Braidwood | Apr. 24, 1945 |
| 2,437,555 | Rees | Mar. 9, 1948 |
| 2,476,257 | Hoff | July 12, 1949 |
| 2,566,026 | Hughes | Aug. 28, 1951 |